US011107465B2

(12) United States Patent
Gustman et al.

(10) Patent No.: US 11,107,465 B2
(45) Date of Patent: Aug. 31, 2021

(54) NATURAL CONVERSATION STORYTELLING SYSTEM

(71) Applicant: Story File LLC, Pacific Palisades, CA (US)

(72) Inventors: Samuel Gustman, Pacific Palisades, CA (US); Stephen Smith, Los Angeles, CA (US); Heather Maio-Smith, Los Angeles, CA (US); Julia Campbell, San Jose, CA (US); Andrew Jones, San Jose, CA (US)

(73) Assignee: StoryFile, LLC, Pacific Palisades, CA (US)

( * ) Notice: Subject to any disclaimer, the term of this patent is extended or adjusted under 35 U.S.C. 154(b) by 0 days.

(21) Appl. No.: 16/168,702

(22) Filed: Oct. 23, 2018

(65) Prior Publication Data

US 2020/0227033 A1    Jul. 16, 2020

(51) Int. Cl.
*G10L 15/22* (2006.01)
*G10L 15/18* (2013.01)
*G06F 3/16* (2006.01)
*G10L 15/08* (2006.01)

(52) U.S. Cl.
CPC .............. *G10L 15/22* (2013.01); *G06F 3/167* (2013.01); *G10L 15/1822* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 5,870,755 | A  | * | 2/1999 | Stevens | G06F 16/7844 |
| 6,944,586 | B1 | * | 9/2005 | Harless | G06Q 90/00 |
| | | | | | 703/23 |
| 8,751,231 | B1 | * | 6/2014 | Larsen | G10L 25/54 |
| | | | | | 704/243 |
| 10,607,141 | B2 | * | 3/2020 | Jerram | G10L 13/00 |
| 10,607,188 | B2 | * | 3/2020 | Kyllonen | G06Q 10/1053 |
| 2003/0137537 | A1 | * | 7/2003 | Guo | G10L 15/1822 |
| | | | | | 715/751 |
| 2004/0230410 | A1 | * | 11/2004 | Harless | G10L 15/26 |
| | | | | | 703/6 |
| 2006/0170945 | A1 | * | 8/2006 | Bill | H04L 29/06 |
| | | | | | 358/1.13 |

(Continued)

*Primary Examiner* — Jonathan C Kim
(74) *Attorney, Agent, or Firm* — J D Harriman; Foundation Law Group LLP (57) ABSTRACT

The present application discloses a multi-media interactive story-telling system that provides natural conversational interactions between a human user and a contributor who appears in multi-media recordings. The multi-media interactive story-telling system includes an intake device for recording interview sessions in which a contributor tells a life story about her life experience. The contributor may rely on a script when creating the life story. The multi-media interactive story-telling system further comprises storage devices for storing the recorded interview sessions and processors for organizing the recorded interview sessions. The multi-media interactive story-telling system further comprises an interactive device for retrieving and playing a recorded interview session in response to a query from a user.

39 Claims, 8 Drawing Sheets

(56) References Cited

U.S. PATENT DOCUMENTS

| | | | |
|---|---|---|---|
| 2006/0293924 A1* | 12/2006 | Gardiner | G16H 10/20 705/3 |
| 2007/0043567 A1* | 2/2007 | Gao | G10L 15/26 704/257 |
| 2008/0091692 A1* | 4/2008 | Keith | G06F 16/958 |
| 2008/0168523 A1* | 7/2008 | Ansari | H04W 12/065 725/131 |
| 2009/0144060 A1* | 6/2009 | Groeger | G10L 13/00 704/260 |
| 2009/0162824 A1* | 6/2009 | Heck | G06N 3/004 434/322 |
| 2010/0114791 A1* | 5/2010 | Gold | G06Q 30/0282 705/347 |
| 2013/0018895 A1* | 1/2013 | Harless | G10L 15/1822 707/748 |
| 2013/0041921 A1* | 2/2013 | Cooper | G06F 16/3338 707/780 |
| 2013/0226578 A1* | 8/2013 | Bolton | G06Q 10/1057 704/235 |
| 2014/0074866 A1* | 3/2014 | Shah | G06F 16/78 707/749 |
| 2014/0365566 A1* | 12/2014 | Lessin | H04L 67/22 709/204 |
| 2015/0006171 A1* | 1/2015 | Westby | G10L 15/26 704/235 |
| 2015/0154956 A1* | 6/2015 | Brown | G06F 16/353 704/235 |
| 2016/0247068 A1* | 8/2016 | Lin | G06N 5/02 |
| 2017/0053186 A1* | 2/2017 | Allen | G06K 9/00302 |
| 2017/0160918 A1* | 6/2017 | Torbey | G06F 3/04847 |
| 2017/0213190 A1* | 7/2017 | Hazan | G06Q 10/1053 |
| 2018/0278504 A1* | 9/2018 | Alazraki | H04L 43/04 |
| 2018/0336048 A1* | 11/2018 | Zarlengo | G06F 9/453 |
| 2019/0052584 A1* | 2/2019 | Barve | G06Q 30/016 |
| 2019/0198011 A1* | 6/2019 | Kerr | G06N 20/00 |
| 2019/0378428 A1* | 12/2019 | Nevarez | G06F 40/131 |
| 2020/0065394 A1* | 2/2020 | Calderon | G06K 9/6267 |
| 2020/0137001 A1* | 4/2020 | Wu | G06F 40/35 |

* cited by examiner

NATURAL CONVERSATION STORYTELLING SYSTEM

FIELD OF THE SYSTEM

The present disclosure relates generally to human-machine interactive systems, and more specifically to a storytelling system designed to conduct natural conversation with a human user as a contributor who appears in a multi-media recording.

BACKGROUND OF THE SYSTEM

There has been a trend for people to spend more of their time in the digital world, replacing real-world face-to-face interaction with digital interaction (e.g. texts, tweets, email, Facebook, Instagram, and the like). For many people, even a live telephone conversation is avoided in favor of digital messaging. This trend, along with recent improvements in storage capacity and the processing power of personal devices, makes it easier for people to record and document their daily lives, and to build up repositories of multi-media data files, such as text posts, photos, and videos. People are sharing these types of multi-media data files through uploading, selecting, clicking, and passive viewing. Existing technologies, such as social media websites and applications, have become standard methods for a person to curate data about their life and share their stories with their friends, family, and social circle. People also use social media to share information about a subject domain, which they may have interest or expertise in, when they would like to contribute their knowledge or opinion. As contributors, they primarily use discussion boards, text-based exchange or user interface to interact and engage with those who are interested.

In another technological area, intelligent human-machine interactive systems, such as Alexa, Siri, Cortana and the like. These systems are voice-activated, natural language processors that first interpret a user's brief general query and then search designated databases to return a single result. The query is usually task-based and limited to a few specific functions. The returned result is often text-based and then converted into an audio clip to be played to the user. These systems fall short in that they lack the ability to simulate a face-to-face, query-based conversation with another human being.

In these systems, voice queries are converted into text and the converted text is used to search metadata associated with responses. Responses may comprise an answer to an inquiry or a computer program to perform an identified task. The metadata in these systems are carefully engineered and tested before being released to customers, and customers cannot change the metadata stored in these commercially available systems. These systems do not provide rich, user-generated metadata to be searched for highly specific content, other than date, place, object recognition or face recognition. For example, these systems do not allow searches for opinion, emotion, experience, activity, etc.

These trends have reduced personal and direct communication, which can have a limiting effect on civilization. Through conversation, human beings can quickly communicate complex concepts, emotions, events, etc. by breaking them down into short story segments. By asking questions, we can rapidly redirect the conversation, build connections, and learn new information. This unique ability can be lost when employing asynchronous and one way digital communication.

However, in-person conversations or real-time video calls are restricted by time, social circle, and location. A person would not be able to converse with their deceased ancestors or a celebrity idol they never met before. A person would not be able to facetime a friend who is traveling in a remote region and does not have easy access to the Internet but wants to share their travel experience. While our world is increasingly interconnected across large distances, it is difficult to maintain face-to-face connections, let alone pass down generations of human history. When the individuals who lived through an event are no longer with us to tell their stories, those stories are lost. Reading a contemporaneous text or secondary source is not the same as listening to or getting to know a real person, to see them, to listen to the story from the source.

SUMMARY OF THE SYSTEM

Accordingly, it is an objective of this present disclosure to teach a natural conversation storytelling system (NCSS) that allows contributors to contribute to a content database and users to ask questions of the content database through voice-activated commands. The content database is a dynamic multilayered database, and comprises videos, supplemental photos, documents, and other media files. The videos are multi-media recordings captured by contributors answering structured questions from scripts and edited by the contributors or others. In the content database, multi-media files are automatically transcribed and turned into data files. All data may be, for example, stored in the system through cloud services that can be accessed and replayed instantly in any order through voice-activated commands from an inquirer interested in some specific content or specific contributors.

The system disclosed herein employs a method of navigating large media archives through a conversational interface. The system provides an intuitive interface for contributors to record and upload media responses, as well as a second, inquiry user interface to collect user queries and host real-world, face-to-face conversation, leveraging machine learning algorithms to interact with collected contributor responses and facilitate natural conversation between a machine and a human being. As multiple contributors add content to the content database and multiple users engage the system in natural conversation, the system automatically identifies metadata such as places, people, objects, themes, emotions, sentence structures, etc. that repeat across multiple inquires and responses and stores the metadata in the content database. As users add responses and inquiries to the system and the system continually retrains its machine learning component to improve the accuracy of the natural-language search and retrieval system, the end result is an intelligent interactive video platform for life-like and real-time conversational interaction between contributors and inquirers.

The system disclosed herein provides an intuitive interface for users to record and upload media responses, leveraging machine learning algorithms applied to multiple users to automatically improve the natural language understanding. The system merges the technologies of data management with the art of face to face communication. The data components of a contributor's recording and the natural language-facilitated, artificial intelligence search and retrieval allow people to interact in natural conversation with a pre-recorded human contributor. A contributor can record their experience, stories, opinion, etc. in a multi-media format and store the pre-recorded digital files as "ContributorFiles." Through ContributorFiles, a contributor can have a conversation with a user, when the contributor is not present or no longer alive.

In the present system, ContributorFiles can be captured through a multilayered recording system, stored in a database (e.g. cloud storage), organized through automatically and manually captured metadata, and retrieved and played in response to user inquiries.

In one embodiment, a multi-media interactive story-telling system according to the present disclosure comprises an intake device configured to record one or more interview sessions in which one or more contributors create interactive stories by answering questions defined in a script. The multi-media interactive story-telling system further comprises storage devices for storing the one or more recorded interview sessions of the one or more contributor, and an interactive device configured to retrieve and play a recorded session of a contributor stored on the storage devices in response to a query from a user. The query is interpreted as being directed to an interactive story of a contributor and the recorded session retrieved by the interactive device correlates to the interactive story of the contributor to which the query is directed.

In one embodiment, improvement of the correlation between the recorded session retrieved by the interactive device and the life story of the one or more contributors to which the query is directed is achieved through machine learning. In one embodiment, the recorded interview sessions may be edited by the one or more contributors before being committed to the storage devices, or augmented by photos, documents or media files before being committed to the storage devices. The one or more recorded interview sessions may be transcribed and one or more keywords may be extracted from the transcripts of the one or more transcribed interview sessions for cataloguing and retrieving. The transcripts may be stored as metadata of the one or more transcribed interview sessions. The transcripts of the one or more transcribed interview sessions may be stored in a natural language database.

In one embodiment of the multi-media interactive story-telling system, the one or more keywords may be stored as metadata of the one or more interview sessions. The metadata further comprises location data automatically retained by the intake device during the one or more interview sessions and information manually input by the contributors. The one or more recorded interview sessions may be automatically transcribed by speech-to-text translation.

In one embodiment of the multi-media interactive story-telling system, the one or more contributors create life stories based on pre-defined or bespoke scripts. The scripts can be drafted to address a life story, a personal experience, an opinion or a subject domain familiar to one of the contributors. In one embodiment, different scripts are created for different applications of the multi-media interactive story-telling system. Different applications of the multi-media interactive story-telling system may include dating services, educational programs, family legacies, historic documentary, medical testimonials, community stories, executive hiring, FAQ services, customer services, training services, mentoring services, financial advice, advice lines, professional advice, archival services and other services which benefit from interactive question-and-answering.

In one embodiment of the multi-media interactive story-telling system, the scripts comprise questions to be answered by the one or more contributors during the interview sessions. The intake device may be configured to present follow-up questions based on answers from the one or more contributors.

In one embodiment of the multi-media interactive story-telling system, the one or more recorded sessions may include filler segments in which the one or more contributors are speaking pleasantries or in a listening pose. A filler segment in which the one or more contributors are speaking pleasantries may be retrieved by the interactive device for playing back in response to a query from the user or when a pleasantry from the user is asked. In one embodiment, the filler segment of the contributor in a listening pose may be used in between queries of the user.

In one embodiment of the multi-media interactive story-telling system, the interactive device may be further configured to retrieve and play a multi-media file as a response to a query or along with the recorded session being retrieved by the interactive device. The multi-media file may be retrieved from a local device, over a network, or from the internet. The multi-media file and the recorded sessions along with the photos, documents or media files may be retrieved as a response to a query. The one or more recorded interview sessions may be divided into multiple segments using markers and separate metadata is created for each segment.

In one embodiment of the multi-media interactive story-telling system, the storage devices may be locally connected storage hardware or cloud-based storage devices. The interactive device may be configured to cache recorded sessions that correspond to commonly asked queries.

In one embodiment, an interview intake device for a multi-media story-telling system disclosed herein comprises a display device for displaying questions defined in a script, and recording devices for recording one or more interview sessions in which one or more contributors answer the questions displayed on the display device. The interview intake device for a multi-media story-telling system further comprises processors configured to generate metadata for the one or more recorded interview sessions for cataloguing and retrieval. The processors may be further configured to generate follow-up questions.

The one or more recorded interview sessions may be automatically transcribed and transcripts are used as part of the metadata of the one or more interview sessions. The metadata of the one or more interview sessions may comprise one or more keywords extracted from the transcripts, timestamps and other data automatically processed by the processors during the one or more interview sessions, and information manually input by the contributors.

In one embodiment of the interview intake device, different scripts may be prepared for different applications of the multi-media story-telling system. In one embodiment, the interview intake device may be further configured to record filler segments in which the contributors are speaking pleasantries or in a listening pose. The processors may be configured to combine a recorded interview session with the transcript, auxiliary media files, and metadata into a single ContributorFile.

In one embodiment of the multi-media interactive device disclosed herein, the multi-media interactive device comprises an input device that features a user interface. The input device is configured to receive a query from a user. The multi-media interactive device further comprises an output device for playing back recorded interview sessions. The interview sessions may be recorded by one or more contributors and in each interview session the one or more contributors answers a question defined in a script. The multi-media interactive device also comprises processors configured to retrieve a recorded interview session in response to the query. In the recorded interview session, the answer from the one or more contributors correlates to the query. The processors may be configured to retrieve the recorded interview session in which the question the one or more contributors answers matches the query.

In one embodiment, a list of candidate contributors may be presented in the user interface on the input device of the multi-media interactive device for the user to select one contributor from the list, and interview sessions featuring the selected contributor are retrieved and played back. In one embodiment, the list of candidate contributors may be generated based on common interests between the user and each candidate contributor. The list of candidate contributors may be generated based on one or more of the following factors: popularity, subject domain, keywords, talents, experience, and names. In one embodiment, the list of candidate contributors may be generated based on the emotion of the user detected by the multi-media interactive device.

In one embodiment, the input device may be a touch-screen, a microphone, a smart glass, holographic display, or a virtual assistant device. In one embodiment, the processors are configured to retrieve an auxiliary file along with the interview session for playing back.

The present disclosure also teaches a method of hosting an interactive story-telling conversation between a user and a contributor selected by the user. The method comprises receiving from the user a selection of the contributor and retrieving a first filler recording segment of the contributor, wherein the filler segment features the contributor speaking a pleasantry. When a query from the user is received and the query is addressed to the contributor, the query is processed. A recording segment featuring the contributor that provides an appropriate answer to the query is identified. In the recording segment, the contributor narrates his or her personal experience or opinion. The recording segment is the retrieved and played to the user. After the recording segment is finished, the user may pose a follow-up question and the follow-up question is processed in a similar manner. In one embodiment, the recording segment may be accompanied by other media files or documents.

BRIEF DESCRIPTION OF THE DRAWINGS

These and other features of the present disclosure will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

DETAILED DESCRIPTION

The system is described more fully hereinafter with reference to the accompanying drawings. The system may, however, be embodied in many different forms and should not be construed as limited to the examples set forth herein. Rather, these examples are provided so that this disclosure will be thorough and complete, and will fully convey the scope of the disclosure to those skilled in the art.

In the present disclosure, a multi-media interactive story-telling system creates a digital story-telling database that can receive, store, and organize rich source materials for natural conversational interactions between a human user and a contributor who appears in a recorded interview session. Rich source materials include digital recordings, audio or video. Rich source materials may also include auxiliary files such as photos, documents, audio clips, etc. Rich source materials may further include metadata derived from story-telling narratives, opinion, analysis, events, places, people and subject content, which are interrelated. In the present disclosure, such rich source materials are referred to as "ContributorFiles."

The exemplary multi-media interactive story-telling system disclosed herein enables natural conversation between a human user and the digital image of a contributor. The story-telling system provides a user interface to allow a contributor to input audio and video responses to a set of pre-defined or customized questions, which is referred to as "script" herein. In addition to the audio and video recordings, a contributor can choose, on their own or upon suggestions from the system, other media files such as photos, videos, text, etc. to augment the stored audio and video recordings. These auxiliary files may be retrieved from local storage devices, social media websites, or sources on the Internet. These auxiliary files are used to enrich the story-telling of the contributor and are part of the ContributorFile created by the contributor and stored by the story-telling system.

The exemplary multi-media interactive story-telling system is user driven and user friendly. An untrained user can author or contribute their own digital content using an intuitive and automated interview system to create video, audio, and other multimedia content. When a user wishes to use the multi-media interactive story-telling system, he selects a contributor that is of interest to him. In one embodiment, a list of contributors may be presented to him for selecting. The list of contributors may be determined based on subject matter, user preference, history of past user selections, etc. The user can place inquiries into the contributor's database, and media files are retrieved and played back in response to the user's inquiries. When the retrieved media files are played, the story-telling system creates the appearance of a continuous conversation between the inquirer and the contributor who appears in the media file. The user can enter inquiries in a real-time sequence. The inquiries may be input as text into an input device. The inquiries may be voiced into a microphone and captured and transcribed into text by the multi-media interactive story-telling system. The story-telling system provides seamless question and answer engagement between the user/inquirer and the contributor. The contributor appears in pre-recorded responses and/or other multi-media files.

Retrieved responses may combine multiple media formats and files. For example, a question such as "tell me about your vacation in Italy" can trigger a video response in which the contributor tells a story about her vacation in Italy. Along with the video response, photos and other media files may be displayed to augment the video response while it is being played. These photos and media files may be tagged with the time and place of the Italian vacation of the contributor. They may be organized into the ContributorFile of the video response when the video response is first produced or added later to the ContributorFile. After the first video response, additional responses are retrieved and played in response to follow-up questions posed by the inquirer. For example, in the video response the contributor mentions a visit to the Colosseum and that triggers a follow-up question from the inquirer about Rome. In response to the follow-up question about Rome, a second video response is retrieved. The second video response may be tagged "vacation," "Italy," and "Rome" to allow fast retrieval.

In one embodiment, the second video response may be retrieved and cached when the first video response is played based on a machine learning algorithm. In the machine learning algorithm, past patterns of inquiries may be studied. If a follow-up question appears to follow another question regularly or most likely or always, the machine learning algorithm may decide to retrieve the response to the follow-up question and store the response locally when the video response to the original question is played to improve system response time and improve the fluency of the conversation between the inquirer and the digital version of the contributor.

Figure 1:
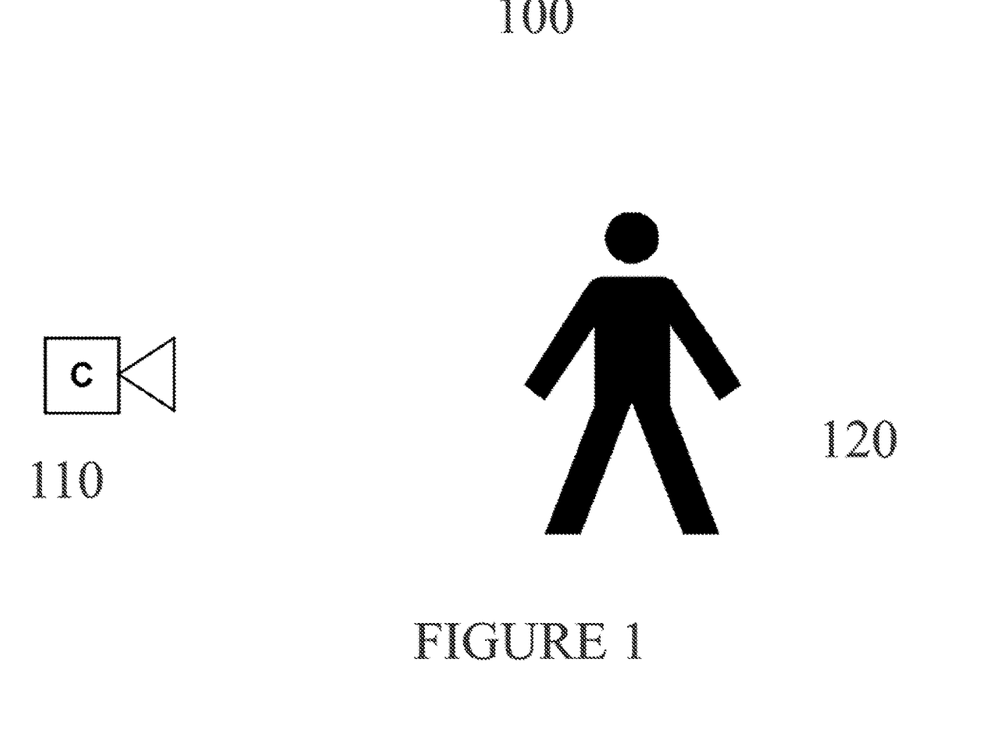
FIG. 1 is an illustration of an exemplary setup for a contributor to record an interview session.

In an exemplary multi-media interactive story-telling system, a contributor starts with building up a content database. The content database comprises ContributorFiles. A ContributorFile is a multi-media digital file plus the accompanying metadata. A ContributorFile may be accompanied by auxiliary files such as photos, audio clippings, and other media files. Examples of a multi-media digital file include a video recording of a contributor telling a story about her experience. FIG. 1 illustrates an exemplary setup for recording an interview session of a contributor.

In referring to FIG. 1, an exemplary system 100 is set up to record an interview session of a contributor 120. The system 100 may include a background screen, lighting equipment and one or more cameras or visual recording devices, such as camera 110, similarly set up as a professional recording studio. In some applications of the exemplary multi-media interactive story-telling system, one or more contributor's content database can be made available commercially and the content database includes professionally made video recordings. In some applications of the exemplary multi-media interactive story-telling system, a contributor may use the story-telling system for personal use or for use by friends and family. Instead of the camera 110 embodiment of FIG. 1, the contributor may simply use a mobile device, e.g., smart phones, tablets, etc., to record their life stories and build their own content database. In general, the exemplary system 100, the mobile device, and any other devices used to capture the contributor's story, are referred to as an intake device. An intake device is configured to record one or more interview sessions in which a contributor creates stories for a ContributorFile database.

Figure 5A:
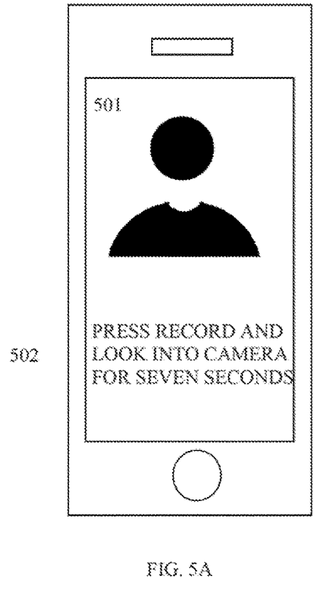
FIGS. 5A-5C illustrate a user interface of the multi-media interactive story-telling system for a contributor to record and store multi-media ContributorFiles in an embodiment of the system.
Figure 5B:
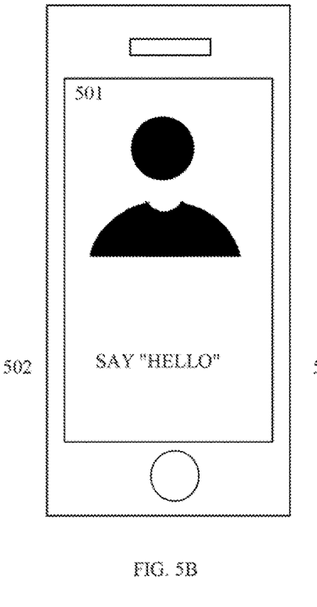
Figure 5C:
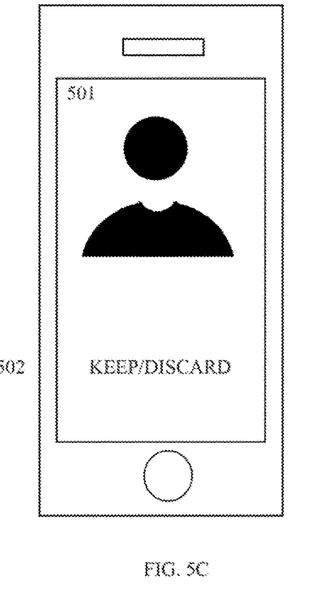

A contributor who wishes to contribute her stories and build up her ContributorFile database can enter the multi-media interactive story-telling system through a contributor user interface. An example of the contributor user interface and how it is used is shown in FIGS. 5A-5C. The example is described in conjunction with using the system on a smartphone or tablet, but it could be used with a desktop computer, studio implementation, and the like. FIG. 5A illustrates the initial interaction of a contributor with the system. The camera is in the so-called "selfie" mode so that the contributor can see herself on screen while making a recording and creating a ContributerFile. The system includes a text area 502 overlaying the screen region 501. The text region provides instructions and questions to the contributor during the making of a ContributorFile. In FIG. 5A the system instructs the contributor to press record and look into the camera for seven seconds. This will give a rest, or listening, pose that may be used during a conversation with a questioner.

FIG. 5B shows the system instructing the contributor to make a statement (e.g. "Hello") that can be used as a response or filler segment as appropriate. After any activity by the contributor on the system, FIG. 5C illustrates that the contributor has the choice to keep or discard the recording and try again.

Figure 8:
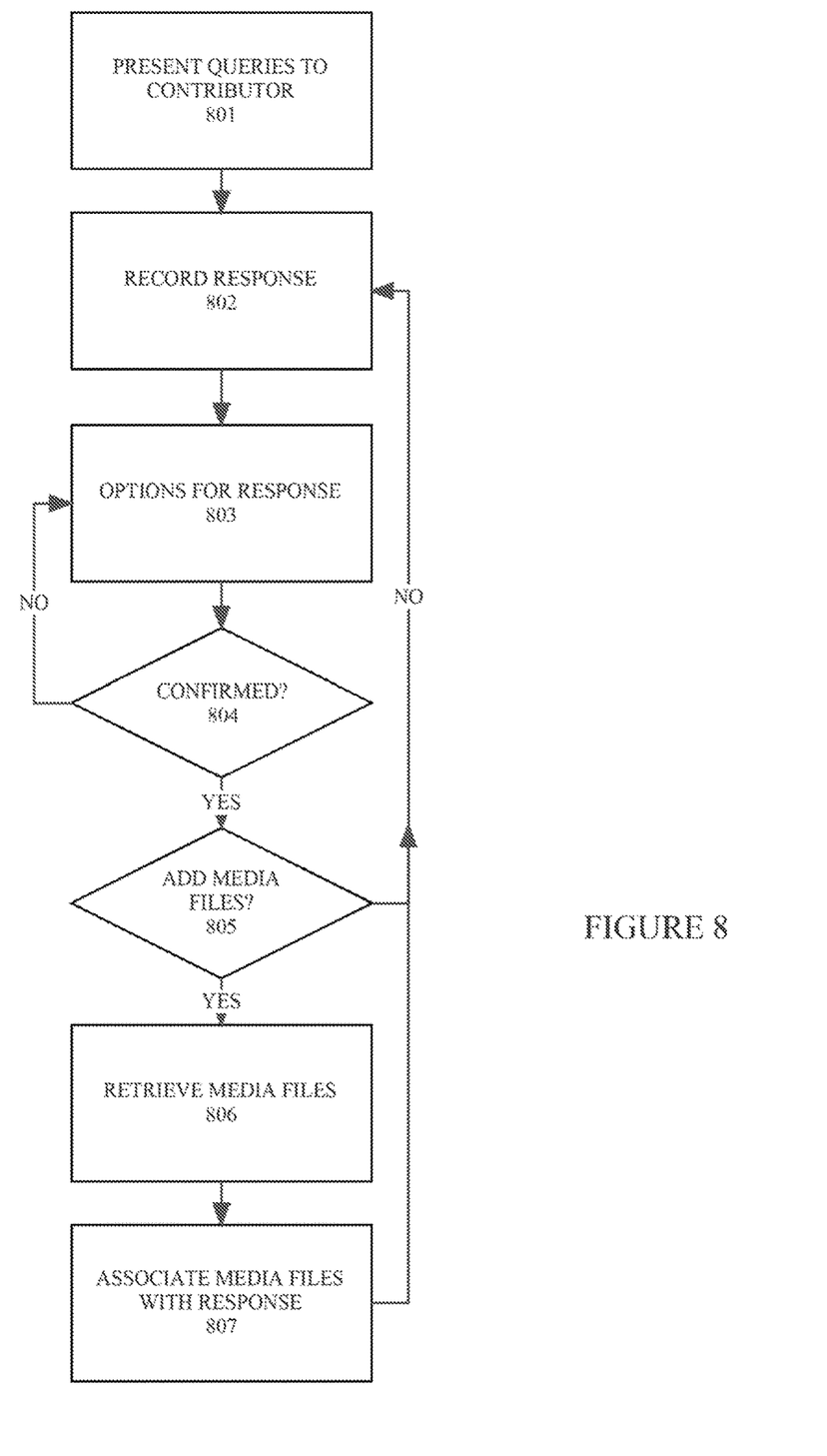
FIG. 8 is a flow diagram illustrating the generation of a ContributorFile by a contributor.

FIG. 8 is a flow diagram illustrating the generation of a ContributorFile by a contributor in an embodiment of the system. In one embodiment, at step 801, the contributor user interface of FIG. 5 presents a list of queries to the contributor. The queries may be presented one at a time to the contributor. The contributor records a response to the query at step 802. After recording the response, the contributor is presented with options for the response at step 803. The contributor may be asked at step 803 to confirm the response, re-record, edit, or re-do the response. (e.g. Keep/Discard of FIG. 5C).

At decision block 804, it is determined if the response is confirmed. If not, the system returns to step 802. If the response is confirmed, the system proceeds to decision block 805. When the contributor has confirmed the response, the system may then ask the contributor if there are any media files available to augment the response, e.g. photographs, videos, audio files, text files, and the like. If the contributor selects media files at decision block 805, the contributor can use the interface at step 806 to retrieve the appropriate media files and identify them as being associated with the response. One, some, or all of the media files may be associated with one or more responses as determined by the contributor at step 807. If there are no media files at decision block 805, or after the media files have been associated with the query at step 807, the system returns to step 802 to record a new response.

During a recording session, a contributor may structure her narration according to a script. The script may comprise a list of questions that are carefully crafted for a particular scenario, life story, or subject matter. Multiple scripts may be pre-defined and stored. Users may be allowed to create their own scripts and follow the pre-generated scripts during a recording session. Scripts can be created to address a particular experience, e.g., childhood, favorite food/restaurant/vacation spot, faith/belief/spirituality, etc. Scripts can also be created to cover a subject domain such as classical music, tennis, chemistry or a contributor's opinion on politics, economics, climate, etc. Using this script, the contributor can record his answer to each of the questions listed in the script. An interview session may include the contributor's answers to all the questions listed in the script. In one embodiment, the questions are displayed in front the contributor as a prompt. The questions may be displayed in a sequence or in one single list. The contributor may also add questions that they may wish to answer within the subject category. In one embodiment, the recording may be divided into multiple segments. Each segment may include the contributor's answer to a single question or a group of similar questions. The segments may be made by adding markers to the recorded interview sessions. In another embodiment, the segments may be made into single files with each single file tagged with separate metadata.

Figure 7A:
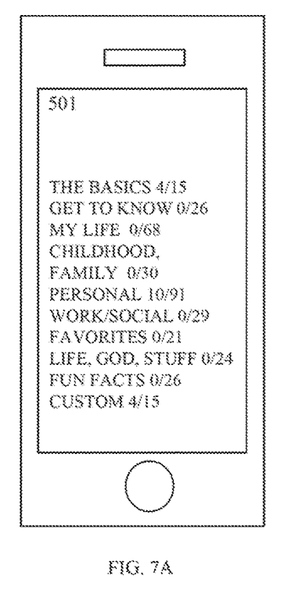
FIGS. 7A-7C illustrate an exemplary script mode in an embodiment of the system.
Figure 7B:
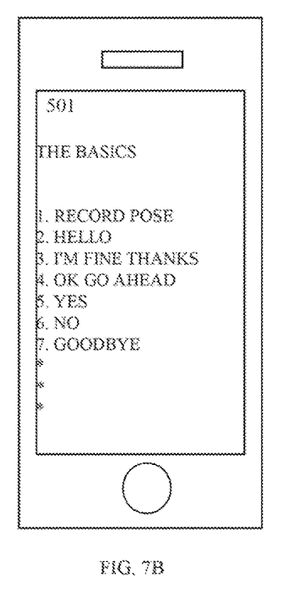
Figure 7C:
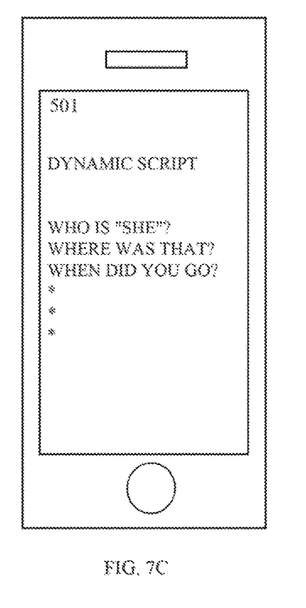

In one embodiment, a script is comprised or a plurality of categories, with each category including a plurality of questions related to that category. FIGS. 7A-7C illustrate examples of a script interface in an embodiment of the system. FIG. 7A illustrates several categories in an embodiment of the system, including "The Basics", "My Life", "Fun Facts", and the like. These categories may be provided to all users in an embodiment of the system. Each category includes an indicator of the total number of questions in the category as well as an indication to the user of how many questions have already been answered in each category. For example, FIG. 7A shows that 4 of 15 questions in The Basics have been answered and that for many categories, no questions have been answered. The contributor is free to move between categories and questions within the category at will, so the contributor can determine on their own how best to build the ContributorFile. The contributor is not required to answer all questions and categories, but a richer experience is provided if they do.

The system contemplates the ability of the contributor to have their own questions via a "Custom" category. When chosen, the contributor can define any number of questions that are then added to the system, with the system tracking how many have been completed.

FIG. 7B illustrates an example of the scripting interface when one of the categories has been selected, e.g. "The Basics". The display 501 shows the questions in the category (scrolling may be required to see all questions) and can include an indicator of questions that have been answered. A contributor is always free to re-record their answers to any questions simply by selecting a previously answered question.

The system also includes machine learning and artificial intelligence to provide dynamic questions that, although not part of the standard scripting, will elicit information that will be helpful in providing a rich experience during interaction with a questioner. FIG. 7C illustrates some of the questions that may be dynamically generated based on answers given by the contributor. The system will parse the answer given by the contributor and look for missing information, such as when a pronoun is used in an answer. The system, using the NLP classifier for example, which may contain a machine learning module or AI module, will send a query to the contributor after the contributor has accepted their answer, to ask for identification (e.g. Who is "she"?). The system may also, when appropriate, ask the contributor for temporal related information, location information, and the like, based on parsing the answers provided by the contributor.

In one embodiment, the contributor can review, trim, filter and add to the recording after the interview session, such as at step 803. Once the contributor is satisfied with the recordings, they approve the recordings at 804 and submit the recordings to their ContributorFile database. The saved recordings can be edited, deleted, or replaced at any time. The contributor may mark a recording as private and thus it can only be seen by the contributor. A recording can also be marked for group playback for an identified group of users. A recording can also be made public for anyone to search, retrieve and review.

The contributor can also record a session in which she is in listening pose for some duration of time, and some sessions in which she is speaking pleasantries, such as "Hello," "Goodbye," and "Thank you!" These filler segments can be stored and used later to fill pauses or gaps between two recording sessions.

Once submitted to the contributor's ContributorFile database, the media segments are automatically saved or rendered onto a storage device. A saved media segment in a ContributorFile database may be tagged by the original question that was answered by the contributor in the media segment. In addition, audio in the media segment may be transcribed into text and entered into the ContributorFile database along with the original question as metadata. Tagging, transcribing, and metadata creation can be made to be automatic in the multi-media interactive story-telling system.

As noted above with regard to steps, 805, 806, and 807, the contributor may also able to contribute additional media files such as photos or audio clippings. In one embodiment, the contributor is invited to add audio prompts, referred herein as "vox-tagging." A vox-tag is an audio file associated with a piece of data that is transcribed and converted into metadata. This vox-tag provides additional metadata capturing time and place to the photos/media files added by the contributor. For example, when a contributor is telling the story of her family vacation in Italy and she wants to include a photo taken during that vacation into the ContributorFile database, she adds an audio prompt to the photo, in which she states: "This is me with my husband Rick and our kids Jane and John in Rome at the Colosseum in 2018. It was the best vacation ever. We are going back next year and will definitely stay in the Hilton again." This audio clipping is then transcribed and the transcription is stored as metadata in the ContributorFile database, to facilitate retrieval. The metadata may include data such as "Rome" and "17 Mar. 2018" captured by the intake device along with information extracted from the transcript, such as who is in the picture (her, her husband and her two kids), her opinion about the vacation ("best ever"), and her plan to return and stay in the Hilton again. Beside photos, a contributor can also add audio clippings, documents, another video made by herself or a video borrowed from any other source, links to external sources, and data files. Examples of data files may include a DNA profile, birth certificate, marriage certificate or any other documents/files the contributor wishes to share.

In one embodiment, the contributor can record her stories without the aid of a structured script. In one embodiment, the contributor can contribute to her ContributorFile database through video blogging, keeping a daily journal, delivering a lecture, speech, or presentation. In one embodiment, the contributor can also test or review her ContributorFile database, for example, by acting as an inquirer. The contributor can also refine the metadata by, for example, adding additional keywords or revising the existing tags, to make searches by other inquirers more accurate.

In one embodiment, the contributor can record prompts and queues for the inquirer, to suggest further narrative exploration. For example, the contributor can ask "Would you like to hear more about my trip?" or "Would you like to see a picture of my hotel?" or the like.

Inquirer Operation

Figure 6A:
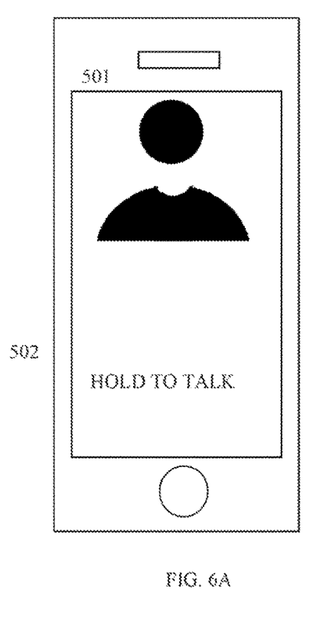
FIGS. 6A-6C is an exemplary illustration of a user interface of the multi-media interactive story-telling system for an inquirer to engage in a natural conversation with a selected contributor.
Figure 6B:
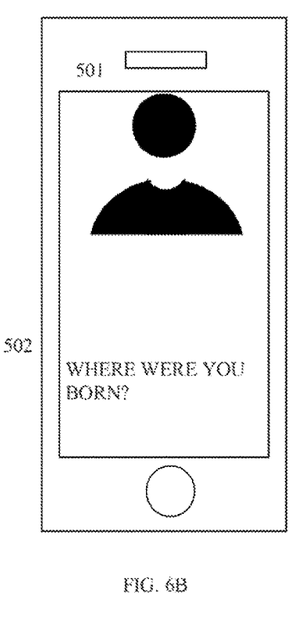
Figure 6C:
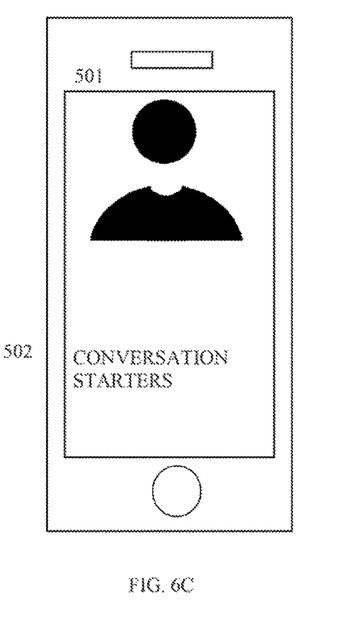

An inquirer enters the multi-media interactive story-telling system through an inquirer user interface. FIGS. 6A-6C illustrate an exemplary inquirer user interface. When the inquirer wishes to engage in a conversation with a particular contributor, the inquirer can use the inquirer user interface to find this particular contributor. In one embodiment, the inquirer can search for a group of contributors—e.g., Gulf War veterans—a type of experience—e.g., concussion—a keyword, a place, etc., or any combination of the categories listed.

FIG. 6A illustrates an interface on a mobile device when a questioner has selected a contributor. The contributor's image is shown in display 501 and the questioner is instructed to press and hold the record button to present a query to the contributor. The system performs speech to text translation and presents the question in text form to the questioner in FIG. 6B. The system then performs the methods described in FIGS. 3 and 9 to determine the correct video segment of the contributor to play back to the questioner. In some cases, the system may suggest "conversation starters" to the questioner as in FIG. 6C. Selecting that presents a plurality of questions that the questioner can simply select by touching or may speak to the system.

When the interactive story-telling system locates the ContributorFile or ContributorFiles the inquirer is looking for, it retrieves the multi-media digital files associated with the ContributorFile or ContributorFiles and plays it for the inquirer. In one embodiment, the system may retrieve a recording of the contributor in a listening pose when such a response is need, for example, when the interactive story-telling session begins. In one embodiment, the interaction system of FIG. 6 provides a list of suggested questions to start the conversation. These suggestions could be a sampling of questions or topics from the script (FIGS. 7A-7C). The questions may be ranked by popularity or relevance to the common conversation.

Figure 2:
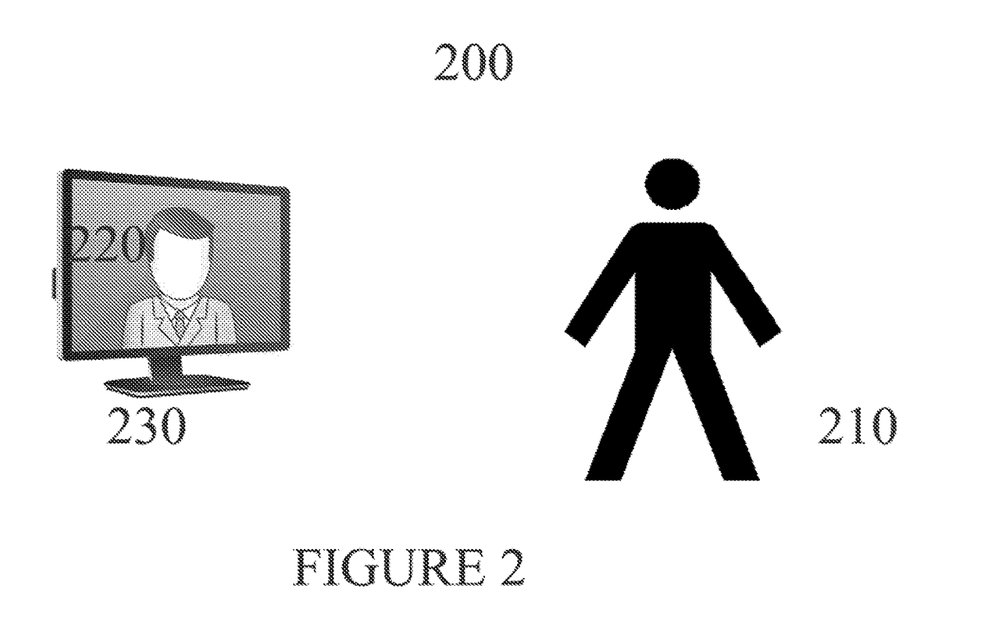
FIG. 2 is an illustration of a natural conversation between an inquirer and a contributor who appears in a multi-media recording.

FIG. 2 illustrates a multi-media interactive story-telling session 200. The inquirer 210 is engaged in a natural conversation with a contributor 220 of her choosing. In one embodiment, the contributor 220 appears in a digital recording played on an output device 230. The session may start with the contributor 220 in a listening pose. The inquirer 210 then poses a question to the contributor 220. The question may be input by the inquirer as text or through a microphone. The multi-media interactive story-telling system may be configured with speech recognition capability and the audio question is converted into a text query that is used to search the ContributorFile database of the multi-media interactive story-telling system. When the best matching ContributorFile is found, the digital recording is retrieved and played on the output device 230. The best matching ContributorFile should provide an appropriate answer to the question posed by the inquirer. The inquirer can pose further questions as follow-up. A second digital recording may be retrieved and played to answer the inquirer's follow-up question. In between the first digital recording and the second digital recording, a filler segment may be played to fill in the gap when the inquirer is typing or voicing her follow-up question. In a filler segment, the contributor may be seen in a listening pose.

In one embodiment, the output device 230 may be a video screen, mobile device, smartphone, tablet, and the like. In one embodiment, the contributor may be recorded and displayed as a hologram, adding to the realism of the contributor/inquirer interaction.

Figure 3:
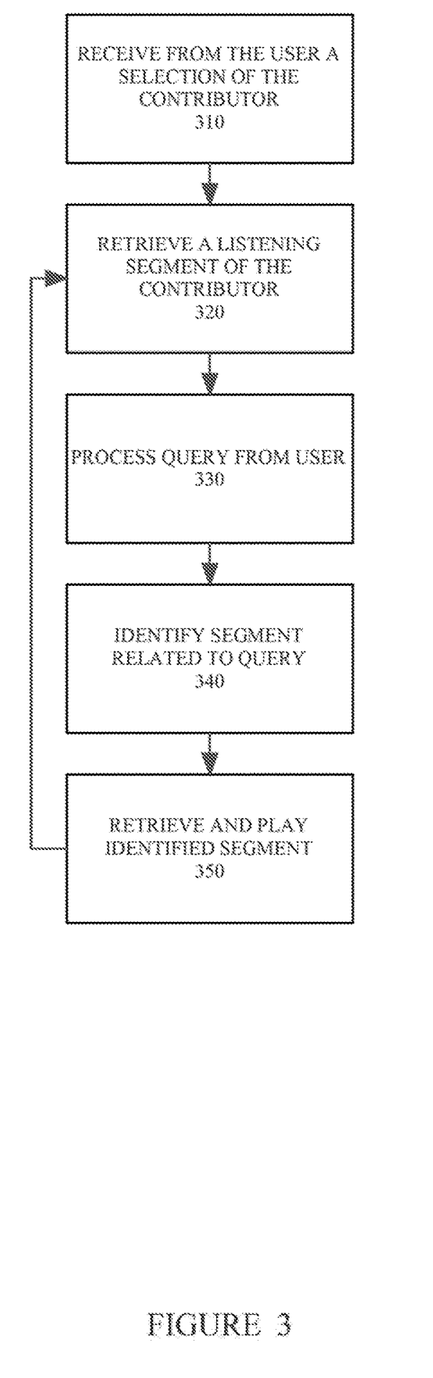
FIG. 3 is a flow-chart illustrating a method of building a ContributorFile database.

FIG. 3 is a flow chart illustrating an exemplary process of playing a multi-media ContributorFile. The method in FIG. 3 comprises the following steps. In step 310, a selection of the contributor is received from the user. In step 320, a first listening segment of the contributor is retrieved and played. The first listening segment features the contributor in a listening pose waiting for a query from the user. In step 330, the user enters a query that is addressed to the contributor. The query is received and processed. In Step 340, based on the query, a recording segment featuring the candidate is identified. The recording segment provides an appropriate answer to the query. The answer relates to the contributor's person experience or opinion. The identified recording segment is then retrieved and played to the user in step 350. The system then loops back to step 320, a listening pose for the contributor, and waits for another query from the user.

Figure 9:
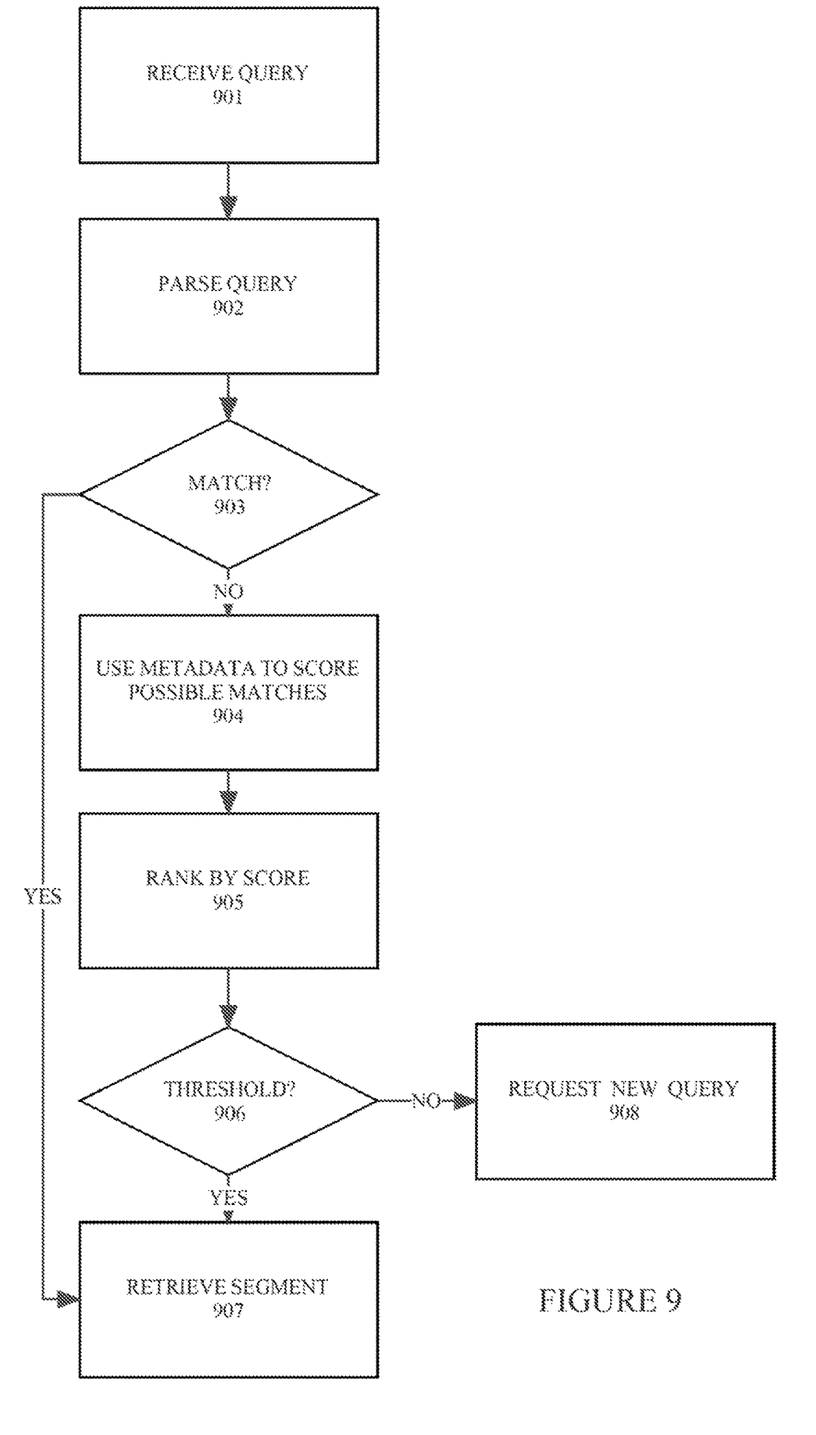
FIG. 9 is a flow diagram illustrating the operation of the step of identifying a contributor response to a query in an embodiment of the system.

FIG. 9 is a flow diagram illustrating the processing step of 330 and the identifying step of step 340 of FIG. 3. At step 901, the system receives a query from an inquirer. As noted above, the query may be spoken, typed, or selected from a menu. At step 902 the query is converted to text (using speech-to-text if the query was spoken) and parsed for the words in the query.

At decision block 903 the system compares the query to the list of questions presented to the contributor. By first comparing the query to the scripted questions, the system can operate more quickly than by searching against the recorded segments. If there is a match of the query to the original question at step 903, the system can retrieve the associated segment at step 907 and play it back for the inquirer.

If there is no match of the query with a scripted question at step 903, the system performs additional comparisons of the query. In one embodiment, the system may compare to all other questions at step 904 and generate match scores (degree of similarity) of the query to the known questions. The system can then rank the matches by score value at step 905. At decision block 906 it is determined if the score is above a required matching threshold. If so, the system can retrieve the segment associated with that highest ranking query at step 907. If not, the system requests another query from the inquirer at step 908.

In one embodiment, the system compares the query to metadata associated with each recorded segment and determines possible matches at step 904. The matches are scored and ranked at step 905 and, if the highest score is above a threshold at step 906, that segment is retrieved and presented to the user at step 907.

Machine Learning

In the multi-media interactive story-telling system, identifying a recording segment that provides an appropriate answer to the question or query posed by the user is improved by machine-learning algorithms. Machine-learning algorithms are employed to better identify in the ContributorFile database a recording segment that provides the most appropriate answer to the query. The multi-media interactive story-telling system relies on artificial intelligence to scale across multiple ContributorFile databases or multiple users to train and tune the system, and learn from one contributor's ContributorFile and apply the learning to another. The machine-learning algorithms used in the present story-telling system transcribes, consolidates, and analyzes responses across multiple users to train a set of natural language classifiers that match new questions to responses within the database. As the size of the databases increases and the number of users/contributors increases, the story-telling system uses machine-learning to continuously improve data retrieval performance.

The story-telling system learns from the different answers provided by different contributors to the same question. The system can analyze the response to identify commonality and differences. The system can also analyze the frequency of words, people, places, objects, and sentence structure within the subset of responses for the purpose of learning: to identify new potential connections/links between recording segments and queries.

The story-telling system can learn to improve questions as the system adds more queries submitted by inquirers. The system can compare new questions with existing questions to identify similar wording and similar responses.

The story-telling system can also learn from interactions between inquirers and contributors' digital representative. Each conversation between an inquirer and a contributor is treated as AI training data for the story-telling system. Variations in wording and phrasing and new vocabulary are continuously identified and applied to improve the system's performance.

The system also benefits from existing technologies such as automatic speech recognition, face recognition, object identification, etc. The system integrates those existing technologies into its intelligent search. The system also caches answers to commonly asked questions to expedite inquiries. With caching and AI-backed search process, the multi-media interactive story-telling system creates the appearance of a continuous and natural conversation between the inquirer and the contributor who appears digitally in the recording segments. The inquirer can ask questions or input inquiries in a real-time fashion as if it were a live conversation. The multi-media interactive story-telling system provides a seamless engagement between the inquirer and the contributor. The conversation maintains visual, semantic and logical continuity throughout the engagement. When there are natural pauses or gaps in the flow of conversation, the system plays filler segments to maintain continuity.

Figure 4:
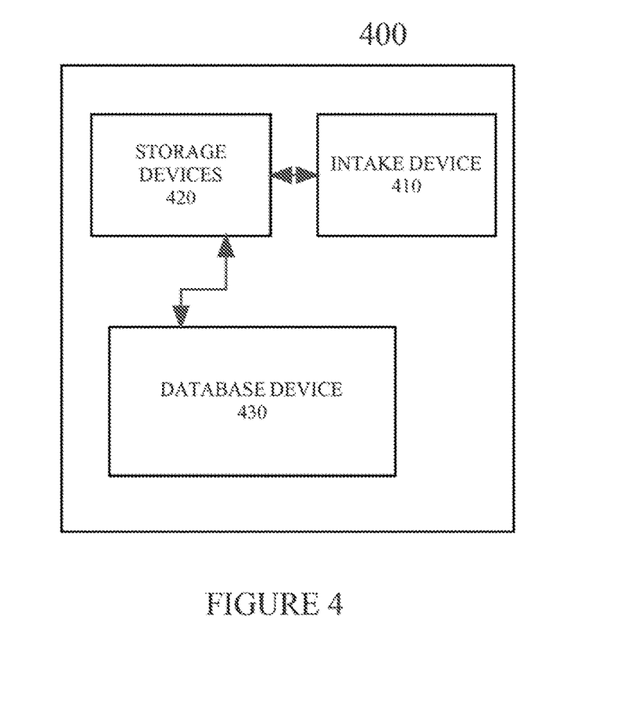
FIG. 4 is a block diagram illustrating an exemplary multi-media interactive story-telling system.

FIG. 4 is a block diagram illustrating an exemplary multi-media interactive story-telling system 400. In FIG. 4, the interactive story-telling system comprises an intake device 410, storage devices 420, and an interactive device 430. The intake device 410 is configured to record one or more interview sessions of a contributor narrating stories about his or her personal stories or opinions. The storage devices 420 are used to store the interview sessions recorded by the intake device 410. The interactive device 430 is configured to retrieve and play an interview session stored on the storage devices 410 in response to a query from a user. In the present disclosure, the different devices, 410, 420, and 430 may refer to any computing devices or components used in a computing device. For example, the devices 410, 420, and 430 may a mobile device, a personal computer, a desktop computer, a tablet, or a smart phone. The devices may include input/output devices, memories or disks, and/or processors or circuits programmed to perform general or specific computing tasks or functionality.

The multi-media interactive story-telling system can be implemented and run as a mobile device application, desktop application or stand-alone commercial product. The system can run locally on a local machine or run as distributed on different machines. The system can be internet based in which the storage devices of the system are cloud-based storage.

Figure 11:
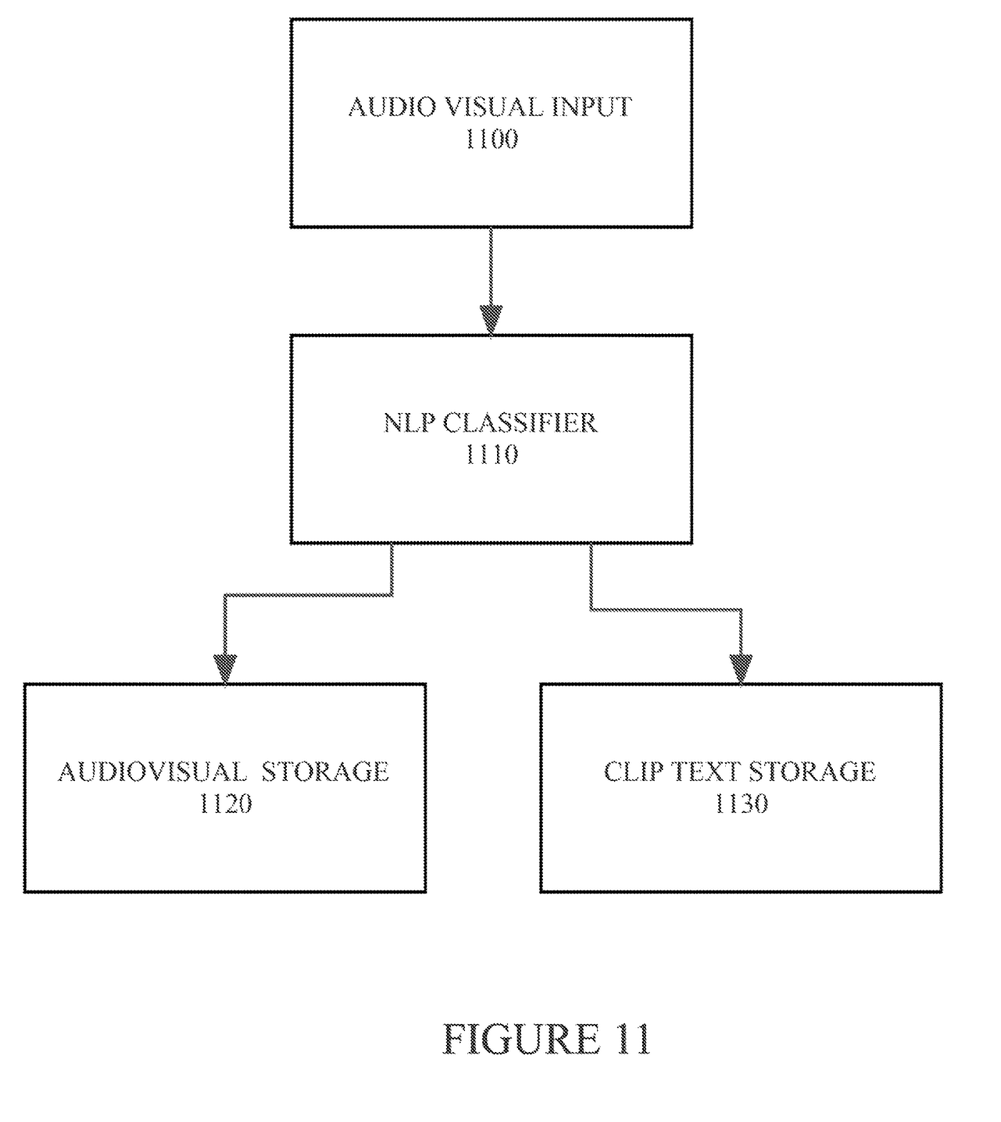
FIG. 11 is a block diagram of an intake device in an embodiment of the system.

FIG. 11 is a block diagram of an intake device 410 in an embodiment of the system. The system takes audiovisual input via the recording device at block 1100. This data is sent to a natural language processor (NLP) classifier 1110 where the text is generated via speech to text analysis and meta data is associated with the text file. The audiovisual data is sent to audiovisual storage 1120 and the clip text and associated metadata is sent to clip text storage 1130.

Example Computer Environment

Figure 10:
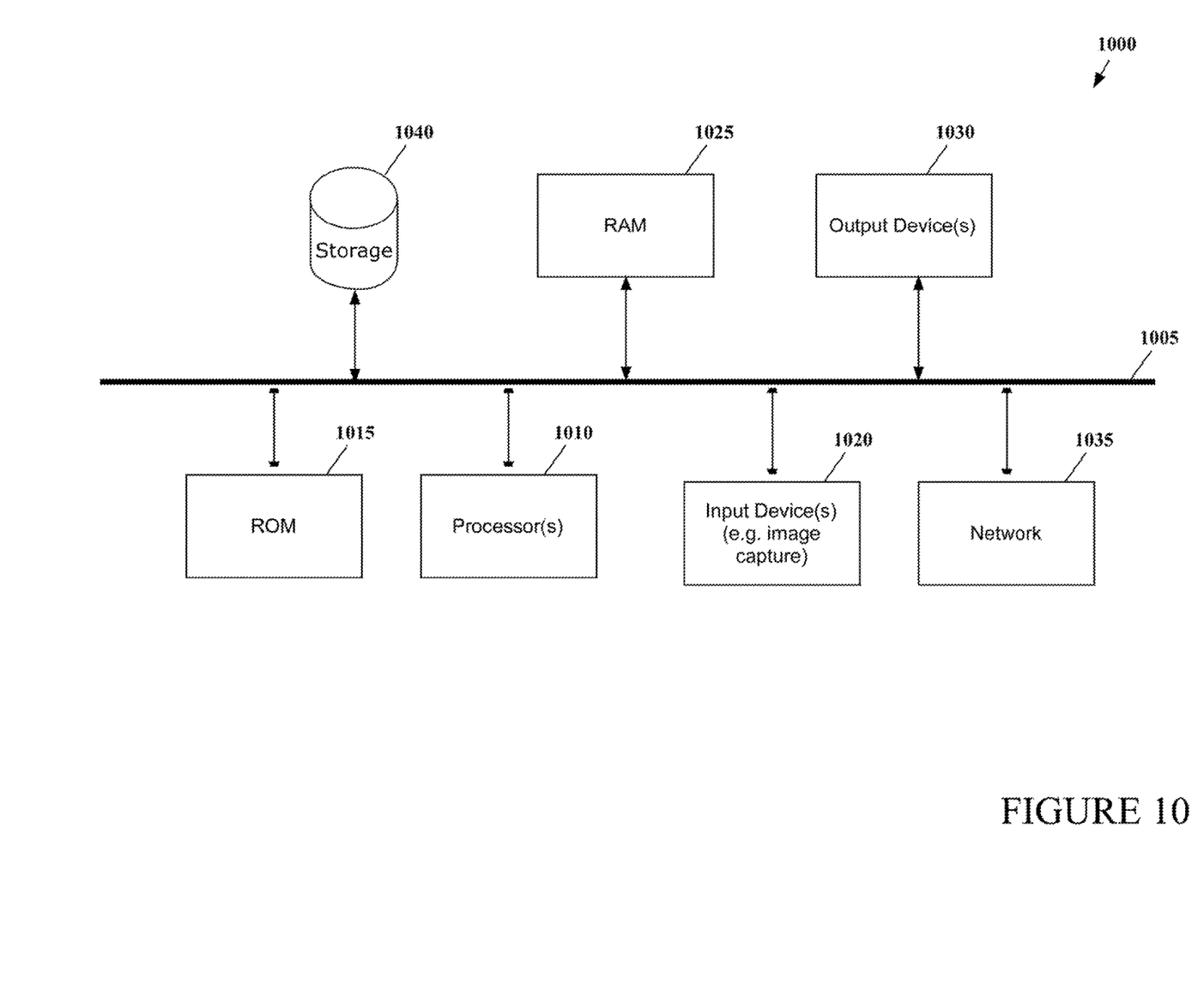
FIG. 10 is an example computer system for implementing an embodiment of the system.

FIG. 10 illustrates an exemplary a system 1000 that may implement the system. The electronic system 1000 of some embodiments may be a mobile apparatus. The electronic system includes various types of machine readable media and interfaces. The electronic system includes a bus 1005, processor(s) 1010, read only memory (ROM) 1015, input device(s) 1020, random access memory (RAM) 1025, output device(s) 1030, a network component 1035, and a permanent storage device 1040.

The bus 1005 communicatively connects the internal devices and/or components of the electronic system. For instance, the bus 1005 communicatively connects the processor(s) 1010 with the ROM 1015, the RAM 1025, and the permanent storage 1040. The processor(s) 1010 retrieve instructions from the memory units to execute processes of the invention.

The processor(s) 1010 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 1010, they cause the processor(s) 1010 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 1010. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 1000, define one or more specific machine implementations that execute and perform the operations of the software programs.

The ROM 1015 stores static instructions needed by the processor(s) 1010 and other components of the electronic system. The ROM may store the instructions necessary for the processor(s) 1010 to execute the processes provided by the system. The permanent storage 1040 is a non-volatile memory that stores instructions and data when the electronic system 1000 is on or off. The permanent storage 1040 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 1025 is a volatile read/write memory. The RAM 1025 stores instructions needed by the processor(s) 1010 at runtime, the RAM 1025 may also store the real-time video or still images acquired by the system. The bus 1005 also connects input and output devices 1020 and 1030. The input devices enable the user to communicate information and select commands to the electronic system. The input devices 1020 may be a keypad, image capture apparatus, or a touch screen display capable of receiving touch interactions. The output device(s) 1030 display images generated by the electronic system. The output devices may include printers or display devices such as monitors.

The bus 1005 also couples the electronic system to a network 1035. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

The systems and methods disclosed herein can be adapted for many different applications. A type of applications that are particular suitable for adaptation of the systems and methods disclosed herein are those in which interpersonal communication is an essential component. Exemplary applications include application for dating services, employment services (nanny, nurses, etc.), sales (cars, furniture, etc.), educational services, and personal or societal history/heritage preservation.

Although the disclosure is illustrated and described herein with reference to specific examples, the disclosure is not intended to be limited to the details shown. Rather, various modifications may be made in the details within the scope and range of equivalents of the claims and without departing from the disclosure.

What is claimed is:

1. A multi-media interactive story-telling system, said system comprising:
    an intake device, said intake device configured to record one or more interview sessions in which one or more contributors create interactive stories by answering questions defined in a script; storage devices for storing the one or more recorded interview sessions of the one or more contributor;
    an interactive device configured to retrieve and play a recorded session of a contributor stored on the storage devices in response to a query from a user, wherein the query is interpreted as being directed to an interactive story of a contributor and the recorded session retrieved by the interactive device correlates to the interactive story of the contributor to which the query is directed;
    comparing the query to a plurality of existing queries and using machine learning to identify similar wording and similar responses,
    using the machine learning to match the query to retrieve and play the recorded session; and
    wherein the interactive device uses a machine learning algorithm to predict a follow-up query that is most likely to follow the query and to retrieve and cache a predicted recorded session corresponding to a response to the follow-up query during the play of the recorded session, wherein the machine learning algorithm is trained on past patterns of inquiries.

2. The multi-media interactive story-telling system of claim 1, wherein improvement of the correlation between the recorded session retrieved by the interactive device and a life story of the one or more contributors to which the query is directed is achieved through machine learning.

3. The multi-media interactive story-telling system of claim 1, wherein the recorded interview sessions are edited by the one or more contributors before being committed to the storage devices.

4. The multi-media interactive story-telling system of claim 1, wherein the recorded interview sessions can be edited after being committed to the storage devices.

5. The multi-media interactive story-telling system of claim 1, wherein the recorded interview sessions are augmented by one or more auxiliary files before being committed to the storage device, and wherein the one or more auxiliary files include photos, documents or media files.

6. The multi-media interactive story-telling system of claim 1, wherein the one or more recorded interview sessions are transcribed and one or more keywords are extracted from the transcripts of the one or more transcribed interview sessions for cataloguing and retrieving.

7. The multi-media interactive story-telling system of claim 6, wherein the transcripts are stored as metadata of the one or more transcribed interview sessions.

8. The multi-media interactive story-telling system of claim 6, wherein the transcripts of the one or more transcribed interview sessions are stored in a natural language database.

9. The multi-media interactive story-telling system of claim 6, wherein the one or more keywords are stored as metadata of the one or more interview sessions, and wherein the metadata further include timestamps and location data automatically retained by the intake device during the one or more interview sessions and information manually input by the contributors.

10. The multi-media interactive story-telling system of claim 6, wherein the one or more recorded interview sessions are automatically transcribed by speech-to-text translation.

11. The multi-media interactive story-telling system of claim 1, wherein the one or more contributors create life stories based on pre-defined or bespoke scripts, and wherein the scripts are drafted to address a life story, a personal experience, an opinion or a subject domain familiar to one of the contributors.

12. The multi-media interactive story-telling system of claim 11, wherein different scripts are created for different applications of the multi-media interactive story-telling system.

13. The multi-media interactive story-telling system of claim 11, wherein the different applications of the multi-media interactive story-telling system include dating services, educational programs, family legacy, historic documentary, medical experiences, community stories, executive hiring, FAQ services, customers services, training services mentoring services, financial advice, advice lines, archival services and other services which benefit from interactive question and answers.

14. The multi-media interactive story-telling system of claim 11, wherein the scripts comprise questions to be answered by the one or more contributors during the interview sessions, and wherein the intake device is configured to present follow-up questions based on answers from the one or more contributors.

15. The multi-media interactive story-telling system of claim 1, wherein the one or more recorded sessions also include filler segments in which the one or more contributors are speaking pleasantries or in a listening pose.

16. The multi-media interactive story-telling system of claim 12, wherein a filler segment in which the one or more contributors are speaking pleasantries is retrieved by the interactive device for playing back in response to a query from the user or when a pleasantry from the user is asked.

17. The multi-media interactive story-telling system of claim 15, wherein a filler segment of the contributor in a listening pose is used in between queries of the user.

18. The multi-media interactive story-telling system of claim 5, wherein the interactive device is further configured to retrieve and play one or more of the auxiliary files as a response to a query or along with the first recorded session being retrieved by the interactive device.

19. The multi-media interactive story-telling system of claim 18, wherein a multi-media file is retrieved from a local device, over a network, or from the internet.

20. The multi-media interactive story-telling system of claim 19, wherein the multi-media file and the recorded sessions along with the one or more auxiliary files are retrieved as a response to a query.

21. The multi-media interactive story-telling system of claim 1, wherein the one or more recorded interview sessions are divided into multiple segments using markers and wherein separate metadata are created for each segment.

22. The multi-media interactive story-telling system of claim 1, wherein the storage devices are locally connected storage hardware or cloud-based storage devices.

23. The multi-media interactive story-telling system of claim 1, wherein the interactive device is configured to cache recorded sessions that correspond to commonly asked queries.

24. A multi-media interactive story-telling system, said system comprising:
  an interview intake device for a multi-media story-telling system, said interview intake device comprising:
  a display device for displaying questions defined in a script;
  recording devices for recording one or more interview sessions in which one or more contributors answer the questions displayed on the display device;
  wherein the one or more contributors are presented with an initial recorded interview session and to review, trim, filter, or add to the initial recorded interview session;
  processors configured to generate metadata for the one or more recorded interview sessions for cataloguing and retrieval;
  processors to add additional media files and vox-tags to trigger display of the additional media files; and
  wherein the one or more recorded interview sessions are automatically transcribed and transcripts are used as part of metadata of the one or more interview sessions;
  and an interactive device comprising one or more processors:
  to compare a query from a user to a plurality of existing queries and to use machine learning to identify similar wording and similar responses;
  to use the machine learning to match the query to retrieve and play the recorded session; and
  wherein the interactive device uses a machine learning algorithm to predict a follow-up query that is most likely to follow the query and to retrieve and cache a predicted recorded session corresponding to a response to the follow-up query during the play of the recorded session, wherein the machine learning algorithm is trained on past patterns of inquiries.

25. The interview intake device of claim 24, wherein the metadata of the one or more interview sessions comprise one or more keywords extracted from the transcripts, timestamps and other data automatically processed by the processors during the one or more interview sessions, and wherein the metadata further comprise information manually input by the contributors.

26. The interview intake device of claim 24, wherein the processors are further configured to generate follow-up questions.

27. The interview intake device of claim 24, wherein different scripts are prepared for different applications of the multi-media story-telling system.

28. The interview intake device of claim 24, wherein the interview intake device is further configured to record filler segments in which the contributors are speaking pleasantries or in a listening pose.

29. The interview intake device of claim 24, wherein the processors are configured to combine a recorded interview session with the transcript, auxiliary files, and metadata into a single story file.

30. A multi-media interactive device, said multi-media interactive device comprising:
    an input device that features a user interface, said input device configured to receive a query from a user;
    an output device for playing back recorded interview sessions, wherein said interview sessions are recorded by one or more contributors and wherein in each interview session the one or more contributors answer a question defined in a script;
    processors configured to retrieve a recorded interview session in response to the query, wherein in the recorded interview session the answer from the one or more contributors correlates to the query;
    comparing the query to a plurality of existing queries and using machine learning to identify similar wording and similar responses;
    using the machine learning to match the query to retrieve and play the answer; and
    wherein the interactive device uses a machine learning algorithm to predict a most-likely follow-up query following the query and to retrieve and cache a predicted answer to the follow-up query during a playback of the answer from the recorded interview session, wherein the machine learning algorithm is trained on past patterns of inquiries.

31. The multi-media interactive device of claim 30, wherein the processors are configured to retrieve the recorded interview session in which the question the one or more contributors answer matches the query.

32. The multi-media interactive device of claim 30, wherein a list of candidate contributors is presented in the user interface on the input device for the user to select one contributor from the list, and wherein only interview sessions featuring the selected contributor are retrieved and played back.

33. The multi-media interactive device of claim 32, wherein the input device is a touch-screen, a microphone, a smart glass, or a virtual assistant device.

34. The multi-media interactive device of claim 32, wherein the list of candidate contributors is generated based on common interests between the user and each candidate contributor.

35. The multi-media interactive device of claim 32, wherein the list of candidate contributors is generated based on one or more of the following factors: popularity, subject domain, keywords, talents, experience, and names.

36. The multi-media interactive device of claim 32, wherein the list of candidate contributors is generated based on the emotion of the user detected by the multi-media interactive device.

37. The multi-media interactive device of claim 30, wherein the processors are configured to retrieve an auxiliary file along with the interview session for playing back.

38. A method of hosting an interactive story-telling conversation between a user and a contributor selected by the user, comprising:
    receiving from the user a selection of the contributor;
    retrieving a first filler recording segment of the contributor, wherein the filler segment features the contributor speaking a pleasantry;
    processing a query from the user, wherein the query is addressed to the contributor; comparing the query to a plurality of existing queries and using machine learning for matching the query and for identifying a recording segment featuring the contributor, wherein the recording segment provides an appropriate answer to the query, and wherein the answer is related to the contributor's personal experience or opinion;
    retrieving and playing the identified recording segment to the user;
    using a machine learning algorithm to predict a follow-up query that is most likely to follow the query and to retrieve and cache a predicted recording segment corresponding to a response to the follow-up query during the play of the identified recording segment, wherein the machine learning algorithm is trained on past patterns of inquiries;
    if the user does not pose a follow-up query, playing a second filler segment featuring the contributor in a listening pose; and
    if the user poses the predicted follow-up query, processing the follow-up query to identify, retrieve the cached predicted recording segment, and play the cached predicted recording segment that provides an appropriate answer to the follow-up query.

39. The method of claim 38, wherein, in the retrieved recording segment, the contributor also mentions one or more media files that are displayed along with the retrieved recording segment.

* * * * *